US012713342B2

(12) United States Patent
Loehr et al.

(10) Patent No.: US 12,713,342 B2
(45) Date of Patent: Aug. 18, 2026

(54) REPORTING TRANSMISSION FOR DISCONTINUOUS RECEPTION

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 110 days.

(21) Appl. No.: 18/354,366

(22) Filed: Jul. 18, 2023

(65) Prior Publication Data

US 2023/0362812 A1 Nov. 9, 2023

Related U.S. Application Data

(63) Continuation of application No. 18/065,445, filed on Dec. 13, 2022, now Pat. No. 11,743,820, which is a continuation of application No. 16/929,372, filed on Jul. 15, 2020, now Pat. No. 11,553,418.

(60) Provisional application No. 62/899,370, filed on Sep. 12, 2019.

(51) Int. Cl.
*H04W 52/02* (2009.01)
*H04W 24/10* (2009.01)

(52) U.S. Cl.
CPC ....... *H04W 52/0216* (2013.01); *H04W 24/10* (2013.01); *H04W 52/0229* (2013.01)

(58) Field of Classification Search
CPC ............. H04W 52/0216; H04W 24/10; H04W 52/0229; H04W 76/28; H04L 5/0051; H04L 5/0057; Y02D 30/70
See application file for complete search history.

(56) References Cited

U.S. PATENT DOCUMENTS

2019/0215896 A1 7/2019 Zhou et al.
2019/0215897 A1 7/2019 Babaei et al.
2020/0314948 A1* 10/2020 Babaei .................. H04L 5/0055
2020/0413412 A1 12/2020 Kim et al.
(Continued)

FOREIGN PATENT DOCUMENTS

EP 2782409 A1 9/2014
EP 2887741 A1 6/2015
WO WO-2020042889 A1 * 3/2020 ........... H04L 5/0057

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.6.0, Jun. 2019, pp. 1-78.

(Continued)

*Primary Examiner* — Marcos L Torres
(74) *Attorney, Agent, or Firm* — Kunzler Needham Hilton

(57) ABSTRACT

Apparatuses, methods, and systems are disclosed for reporting transmission for discontinuous reception. One method includes determining whether a symbol occurs within a discontinuous reception on duration time period. The method includes, in response to determining that the symbol occurs within the discontinuous reception on duration time period, determining whether to transmit a report. The method includes transmitting the report regardless of whether a discontinuous reception on duration timer is running.

19 Claims, 5 Drawing Sheets

(56) References Cited

U.S. PATENT DOCUMENTS

2021/0105066 A1 4/2021 Uchiyama et al.
2022/0159574 A1* 5/2022 Islam ................ H04W 52/0229
2022/0338118 A1* 10/2022 Jang ..................... H04B 7/0626
2025/0317859 A1* 10/2025 Ryu .................. H04W 52/0229

OTHER PUBLICATIONS

3GPP, "3rd Generation Partnership Project; Technical Specification Group Radio Access Network; NR; Physical layer procedures for data (Release 15)", 3GPP TS 38.214 V15.6.0, Jun. 2019, pp. 1-105.
MTI, APT, "CSi Reporting in C-DRX", 3GPP TSG-RAN WG2 #102 R2-1807688, May 21-25, 2018, pp. 1-6.
CATT, CAICT, "New WID: UE Power Saving in NR", 3GPP TSG RAN Meetings #84 RP-191607, Jun. 3-6, 2019, pp. 1-5.

* cited by examiner

REPORTING TRANSMISSION FOR DISCONTINUOUS RECEPTION

CROSS-REFERENCE TO RELATED APPLICATIONS

This application is a continuation of U.S. application Ser. No. 18/065,445 filed on Dec. 13, 2022, which is a continuation of U.S. application Ser. No. 16/929,372 filed on Jul. 15, 2020, which claims priority to U.S. Patent Application Ser. No. 62/899,370 entitled "APPARATUSES, METHODS, AND SYSTEMS FOR A DRX OPERATION CONSIDERING WAKE-UP SIGNALING" and filed on Sep. 12, 2019 for Joachim Loehr, which is incorporated herein by reference in its entirety.

FIELD

The subject matter disclosed herein relates generally to wireless communications and more particularly relates to reporting transmission for discontinuous reception.

BACKGROUND

The following abbreviations are herewith defined, at least some of which are referred to within the following description: Third Generation Partnership Project ("3GPP"), 5th Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("COMP"), Channel Occupancy Time ("COT"), Cyclic Prefix ("CP"), Cyclical Redundancy Check ("CRC"), Configured Scheduling RNTI ("CS-RNTI"), Channel State Information ("CSI"), Channel State Information-Reference Signal ("CSI-RS"), Common Search Space ("CSS"), Control Resource Set ("CORESET"), Dual Connectivity ("DC"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Interruption RNTI ("INT-RNTI"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Master Cell Group ("MCG"), Minimum Communication Range ("MCR"), Modulation Coding Scheme ("MC S"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RIM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Slot Format Indication RNTI ("SFI-RNTI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Semi-Persistent ("SP"), Special Cell ("SpCell"), Single Network Slice Selection Assistance Information ("S-NSSAI"), Scheduling Request ("SR"), Signaling Radio Bearer ("SRB"), Sounding Reference Signal ("SRS"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), Worldwide Interoperability for Microwave Access ("WiMAX"), and Wake-Up Signaling or Wake-Up Signals ("WUS").

In certain wireless communications networks, discontinuous reception may occur.

BRIEF SUMMARY

Methods for reporting transmission for discontinuous reception are disclosed. Apparatuses and systems also perform the functions of the methods. One embodiment of a method includes determining whether a symbol occurs within a discontinuous reception on duration time period. In some embodiments, the method includes, in response to determining that the symbol occurs within the discontinuous reception on duration time period, determining whether to transmit a report. In certain embodiments, the method includes transmitting the report regardless of whether a discontinuous reception on duration timer is running.

One apparatus for reporting transmission for discontinuous reception includes a processor that: determines whether a symbol occurs within a discontinuous reception on duration time period; and, in response to determining that the symbol occurs within the discontinuous reception on duration time period, determines whether to transmit a report. In various embodiments, the apparatus includes a transmitter that transmits the report regardless of whether a discontinuous reception on duration timer is running.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
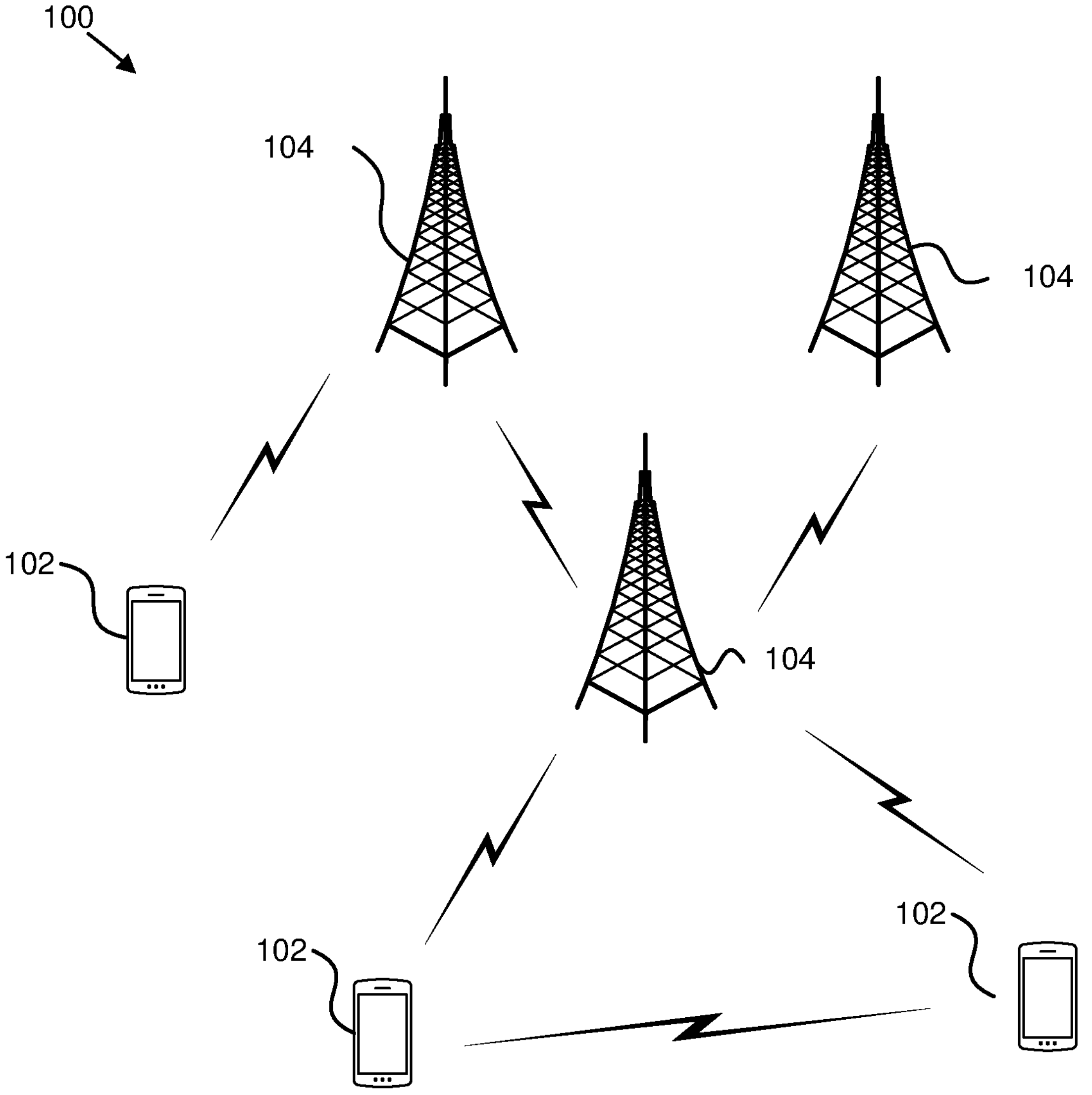
FIG. 1 is a schematic block diagram illustrating one embodiment of a wireless communication system for reporting transmission for discontinuous reception.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for reporting transmission for discontinuous reception. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine whether a symbol occurs within a discontinuous reception on duration time period. In some embodiments, the remote unit 102 may, in response to determining that the symbol occurs within the discontinuous reception on duration time period, determine whether to transmit a report. In certain embodiments, the method includes transmitting the report regardless of whether a discontinuous reception on duration timer is running. Accordingly, the remote unit 102 may be used for reporting transmission for discontinuous reception.

Figure 2:
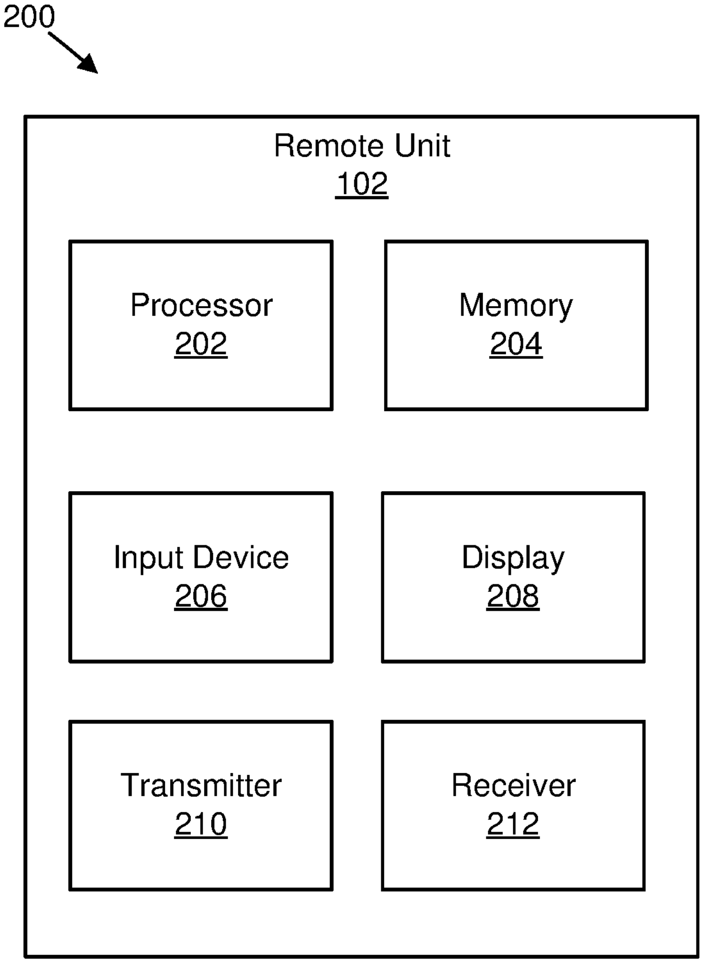
FIG. 2 is a schematic block diagram illustrating one embodiment of an apparatus that may be used for reporting transmission for discontinuous reception.

FIG. 2 depicts one embodiment of an apparatus 200 that may be used for reporting transmission for discontinuous reception. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202 may: determine whether a symbol occurs within a discontinuous reception on duration time period; and, in response to determining that the symbol occurs within the discontinuous reception on duration time period, determine whether to transmit a report. In some embodiments, the transmitter 210 may transmit the report regardless of whether a discontinuous reception on duration timer is running.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
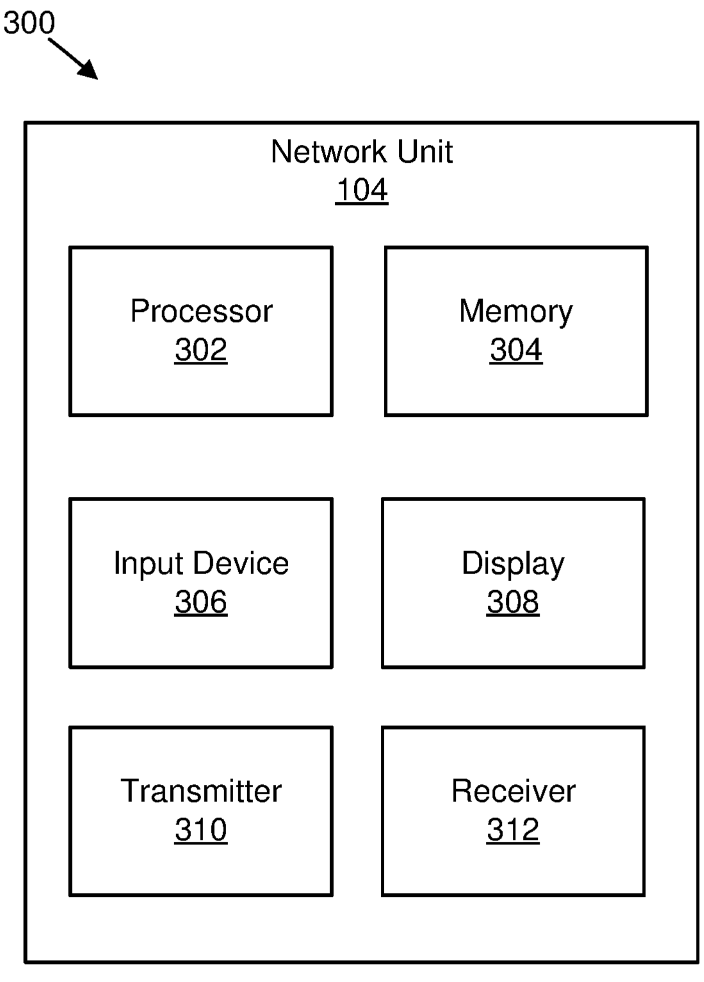
FIG. 3 is a schematic block diagram illustrating one embodiment of an apparatus that may be used for reporting transmission for discontinuous reception.

FIG. 3 depicts one embodiment of an apparatus 300 that may be used for reporting transmission for discontinuous reception. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may be used for transmitting information described herein and/or the receiver 312 may be used for receiving information described herein.

In various embodiments, there may be power saving techniques used to enhance UE battery lifetime. As may be appreciated, a UE battery life may be an important aspect of a user's experience and may influence adoption of 5G handsets and/or services. In some embodiments, DRX operation and/or BWP adaptation may provide UE power saving in NR operation.

In certain embodiments, a power saving technique used may be WUS that adapts a DRX active time of a UE based on some wake-up signal and/or channel. In such embodiments, the UE monitors at a preconfigured occasion (e.g., WUS-occasion) for a new signal and/or channel (e.g., PDCCH-WUS) that indicates whether the UE shall wake-up to monitor PDCCH during a next occurrence of a timer (e.g., DRX-onDurationTimer). If the new signal and/or channel (e.g., PDCCH-WUS) indicates to the UE to wake-up to monitor the PDCCH during the next occurrence of the timer (e.g., DRX-onDurationTimer), the UE starts the timer at its next drx-onDurationTimer duration occasion, otherwise the UE does not start the timer at its next occasion.

In one embodiment, at a WUS occasion during a DRX inactive time, a UE may enter a first stage for monitoring a wake-up PDCCH (e.g., PDCCH-WUS). At this stage, a UE's capability for power saving may be strictly limited. For example, the UE may not expect to receive a same-slot scheduling grant for PDSCH or to be ready to transmit PUCCH in response to the PDSCH reception. Moreover, once the UE decodes a wake-up PDCCH in the WUS occasion, there may be a time offset for a next onDuration. Therefore, in the first stage, a lower power implementation may be achieved by optimizing, at least: (i) a PDCCH processing timeline; (ii) an amount of hardware needed to be online; (iii) a voltage and/or clock operating point of hardware; and/or (iv) an RX bandwidth and a number of antennas. If a PDCCH-WUS is decoded indicating for the UE to wake up at the next onDuration, the UE may transition to a second stage by waking up additional hardware and processing to get ready for DL and/or UL data scheduling.

In various embodiments: 1) a PDCCH-WUS triggers a MAC entity to "wake up" to monitor PDCCH at a reception of a PDCCH-based power saving signal and/or channel for a next occurrence of a drx-onDurationTimer duration; 2) the PDCCH-WUS is considered jointly with DRX (e.g., it is only configured if DRX is configured); 3) the PDCCH-WUS is monitored at occasions located at a configured offset before the start of the drx-onDurationTimer—the offset is part of a physical layer design; 4) on a PDCCH-WUS occasion that a UE is monitoring, if the UE is indicated to wake-up to monitor the PDCCH during the next occurrence of the drx-onDurationTimer duration, the UE starts the drx-onDurationTimer at its next occasion—otherwise it does not; 5) the UE does not monitor WUS during active time; 6) if the UE is in a DRX active time during a PDCCH-WUS occasion, it starts the drx-onDurationTimer at its next Onduration occasion; 7) the WUS is configured on a PCell with CA and SpCell with DC (e.g., PCell on MCG and PSCell on SCG); and/or 8) RLM and RRM measurements are not impacted by WUS design (i.e. the UE continues to measure the required reference signals as per RRM requirements).

In certain embodiments, to provide reasonable battery consumption of user equipment, DRX may have enhancements to handle different numerologies.

In various embodiments, a MAC entity may be configured by RRC with a DRX functionality that controls a UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and/or TPC-SRS-RNTI. In certain embodiments, a common DRX scheme may be used in which there is one common active time applicable for all aggregated serving cells.

In some embodiments, RRC controls DRX operation by configuring the following parameters: 1) drx-onDurationTimer: the duration at the beginning of a DRX Cycle; 2) drx-SlotOffset: the delay before starting the drx-onDurationTimer; 3) drx-InactivityTimer: the duration after the PDCCH occasion in which a PDCCH indicates a new UL or DL transmission for the MAC entity; 4) drx-RetransmissionTimerDL (per DL HARQ process except for the broadcast process): the maximum duration until a DL retransmission is received; 5) drx-RetransmissionTimerUL (per UL HARQ process): the maximum duration until a grant for UL retransmission is received; 6) drx-LongCycleStartOffset: the Long DRX cycle and drx-StartOffset which defines the subframe where the Long and Short DRX Cycle starts; 7) drx-ShortCycle (optional): the Short DRX cycle; 8) drx-ShortCycleTimer (optional): the duration the UE shall follow the Short DRX cycle; 9) drx-HARQ-RTT-TimerDL (per DL HARQ process except for the broadcast process): the minimum duration before a DL assignment for HARQ retransmission is expected by the MAC entity; and/or 10) drx-HARQ-RTT-TimerUL (per UL HARQ process): the minimum duration before a UL HARQ retransmission grant is expected by the MAC entity.

In various embodiments, if a DRX cycle is configured, an active time may include a time while: 1) a drx-onDurationTimer, a drx-InactivityTimer, a drx-RetransmissionTimerDL, a drx-RetransmissionTimerUL, or an ra-ContentionResolutionTimer is running; 2) a scheduling request is sent on PUCCH and is pending; or 3) a PDCCH indicating a new transmission addressed to the C-RNTI of the MAC entity has not been received after successful reception of a random access response for a random access preamble not selected by the MAC entity among contention-based random access preambles.

In some embodiments, operation of DRX gives a UE an opportunity to deactivate radio circuits to save power. In such embodiments, whether the UE actually remains in a non-active time during the DRX period may be decided by the UE. For example, the UE may perform inter-frequency measurements that cannot be conducted during an on duration, and thus may be performed some other time.

In certain embodiments, parameterization of a DRX cycle may involve a trade-off between battery saving and latency. In various embodiments, a long DRX period may be beneficial for a UE's battery life. In some embodiments, it may be beneficial to monitor downlink control signaling in each slot (or more frequently) to receive uplink and downlink grants and/or to react to changes in traffic characteristics.

In various embodiments, if DRX is configured, periodic SRS, semi-persistent SRS, CSI on PUCCH, and semi-persistent CSI on PUSCH may only be sent by a UE during an active-time. In such embodiments, RRC may further restrict CSI on PUCCH so that they are only sent during an on-duration (e.g., referred to as CSI masking).

In some embodiments, DRX-related timers (e.g., drx-InactivityTimer, drx-RetransmissionTimerDL and drx-ShortCycleTimer) may be started and stopped by events such as reception of a PDCCH grant or a MAC control element (e.g., DRX command MAC CE, long DRX command MAC CE). In such embodiments, a DRX status (e.g., active time or non-active time) of a UE may change from one slot and/or symbol to another slot and/or symbol and, therefore, may not always be predictable by the UE or a gNB. In certain embodiments, because a UE may need some time to process received downlink control signaling or information changing a DRX status, and may requires some time to prepare a CSI and/or SRS report (e.g., this processing time may depend on an implementation of the UE), some relaxation of CSI and/or SRS reporting during DRX may be used, such as in NR.

In certain embodiments, assuming that a UE is currently in an active time and a drx-InactivityTimer is running, if the UE receives in a last slot and/or symbol before a DRX inactivity timer expires (e.g., slot N) a PDCCH indicating a new transmission (e.g., UL or DL), the UE may also be in an active time in the next slot and/or symbol (e.g., slot N+1). Due to processing time in the UE, the UE may only know at the end of slot N or beginning of slot N+1, that slot N+1 is still in the active time. In such embodiments, assuming that a periodic CSI report is configured to be transmitted in slot N+1, the UE may not have time to prepare a CSI report for transmission, since it may be assumed to enter DRX (e.g., be in non-active time during slot N+1). As may be appreciated, the UE might not be able to transmit a periodic CSI report in slot N+1.

In various embodiments, to relax UE requirements for CSI and/or SRS reporting during DRX and to introduce some predictable UE behavior that avoids a need of gNB double decoding (e.g., decoding assuming CSI and/or SRS as well as no CSI and/or SRS transmission), the following may be performed: 1) in a current symbol n, if a MAC entity would not be in an active time considering grants, assignments, a DRX command MAC CE, a long DRX command MAC CE received, and a scheduling request sent until 4 ms prior to symbol n if evaluating all DRX active time conditions as specified in this clause: a) not transmit periodic SRS and semi-persistent SRS; and b) not report CSI on PUCCH and semi-persistent CSI on PUSCH; and 2) if CSI masking (e.g., csi-Mask) is setup by upper layers: a) in current symbol n, if drx-onDurationTimer would not be running considering grants, assignments, a DRX command MAC CE, and a long DRX command MAC CE received until 4 ms prior to symbol n if evaluating all DRX Active Time conditions as specified in this clause: not report CSI on PUCCH.

In various embodiments, a UE determines whether to report CSI and/or SRS in a current symbol n by considering downlink signaling (e.g., grants, assignments, a DRX command MAC CE, a long DRX command MAC CE) and/or SR transmissions impacting DRX status having been received respectively transmitted until 4 ms prior to this symbol n. If the symbol n would not be in active time according to a downlink signaling received respective to SR sent until 4 ms prior to symbol n if evaluating all DRX active time conditions, the UE does not transmit periodic SRS and/or CSI on PUCCH and/or semi-persistent CSI on PUSCH.

In some embodiments, with the introduction of WUS signal, starting a drx-onDurationTimer may not be a deterministic event. In various embodiments, a drx-onDurationTimer may be started according to a configured DRX cycle. In certain embodiments, the starting of a drx-onDurationTimer depends on whether WUS signaling at a PDCCH-WUS occasion indicates for a UE to wake-up to monitor PDCCH during a next occurrence of a drx-onDuration (e.g., indicating for a UE to start the drx-onDurationTimer at its next occasion). In various embodiments, because an offset between a WUS occasion and a next occurrence of OnDuration (e.g., also referred to as WUS-Offset) may be shorter than 4 ms, but the condition for determining whether to report CSI and/or SRS in a symbol n depends on control signaling received until 4 ms before symbol n, it may not be clear how and whether the WUS-related signaling (e.g., PDCCH-WUS) affects the CSI and/or SRS reporting during DRX.

As used herein, the term eNB and/or gNB may be used to refer to a base station, but may be replaceable by any other radio access node (e.g., BS, eNB, gNB, AP, NR, and so forth). Furthermore, while the methods described herein may be mainly in the context of 5G NR, various methods described herein may be equally applicable to other mobile communication systems supporting power saving mechanisms. It should further be noted that, as used herein, the term "onDuration" period may refer to a time period at the beginning of a DRX cycle in which the drx-onDurationTimer is running, as one embodiment is shown in FIG. 4.

Figure 4:
FIG. 4 is a timing diagram illustrating one embodiment of a DRX cycle.
Figure 4:
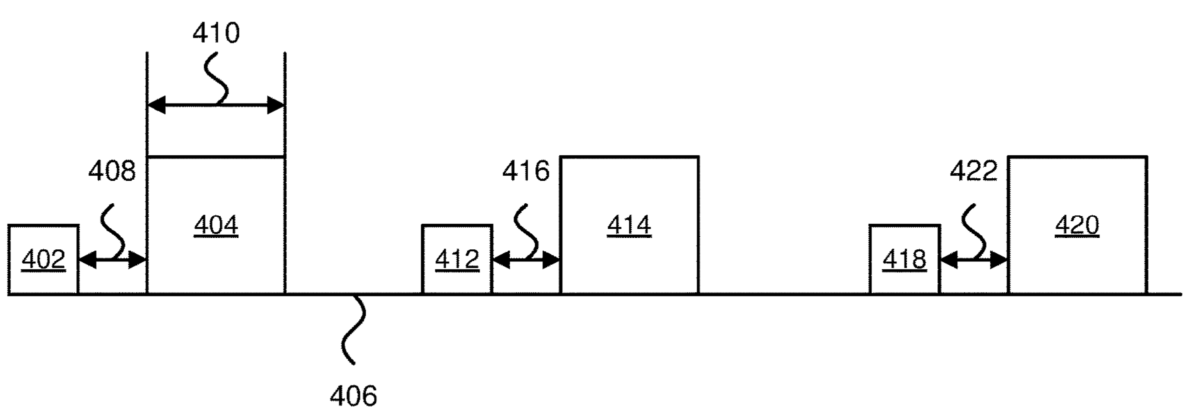

Specifically, FIG. 4 is a timing diagram illustrating one embodiment of a DRX cycle 400. The DRX cycle 400 includes a first WUS occasion 402 and a first onDuration 404 over a time 406. A first WUS offset 408 is a time between the first WUS occasion 402 and the first onDuration 404. The first onDuration 404 has a time duration 410. As may be appreciated, all of the onDurations in the DRX cycle 400 may have the same time duration 410. Further, the DRX cycle 400 also includes a second WUS occasion 412 and a second onDuration 414 over the time 406. A second WUS offset 416 is a time between the second WUS occasion 412 and the second onDuration 414. Moreover, the DRX cycle 400 also includes a third WUS occasion 418 and a third onDuration 420 over the time 406. A third WUS offset 422 is a time between the third WUS occasion 418 and the third onDuration 420.

In a first embodiment, a UE may not consider WUS (e.g., PDCCH-WUS, or wake-up PDCCH) for determining whether to report CSI and/or SRS. In such an embodiment, the UE doesn't consider WUS-related signaling to determine whether a symbol n would be in a DRX active time and/or not be in the active time and whether to transmit periodic SRS, transmit semi-persistent SRS, report CSI on PUCCH, and/or report semi-persistent CSI on PUSCH. In one implementation of the first embodiment, the UE may, for the purpose of CSI and/or SRS reporting, assume that a timer (e.g., drx-onDurationTimer) is started according to a configured DRX cycle. In such an implementation, the UE may transmit periodic SRS, semi-persistent SRS, CSI on PUCCH, and/or semi-persistent CSI on PUSCH even if the timer (e.g., drx-onDurationTimer) is not running and the UE is not in active time (e.g., WUS signal hasn't indicated for the UE to start the timer—drx-onDurationTimer). A first example of an implementation of the first embodiment is found herein. In the first example WUS-PDCCH denotes a WUS signal (e.g., PDCCH-based power saving signal and/or channel) indicating whether a UE is to start a timer (e.g., drx-onDurationTimer) at a beginning of a next DRX cycle (e.g., next onDuration). The first example of the implementation of the first embodiment is as follows: 1) in current symbol n, if the MAC entity would not be in active time considering grants, assignments, a DRX command MAC CE, a long DRX command MAC CE (e.g., excluding PDCCH-WUS) received, and/or a scheduling request sent until 4 ms prior to the symbol n if evaluating all DRX active time conditions as specified in this clause: a) not transmit periodic SRS and semi-persistent SRS; and 2) not report CSI on PUCCH and semi-persistent CSI on PUSCH; and 2) if CSI masking (e.g., csi-Mask) is setup by upper layers: in current symbol n, if drx-onDurationTimer would not be running considering grants, assignments, a DRX command MAC CE, and/or a long DRX command MAC CE (e.g., excluding PDCCH-WUS) received until 4 ms prior to symbol n if evaluating all DRX active time conditions as specified in this clause: not report CSI on PUCCH.

In another implementation of the first embodiment, the UE doesn't consider WUS-related signaling to determine whether a symbol n would be in a DRX active time and/or not be in an active time and whether to transmit periodic SRS, transmit semi-persistent SRS, report CSI on PUCCH, and/or report semi-persistent CSI on PUSCH for the first X ms of each onDuration. In such an embodiment, during this first X ms the UE reports CSI and/or SRS regardless of the DRX status of the UE (i.e., regardless of whether a drx-onDurationTimer is actually running—such as if PDCCH-WUS has indicated to the UE to start and/or not to start the drx-onDurationTimer). In this embodiment, the UE may consider WUS-related signaling (e.g., PDCCH-WUS) only after the first X ms of the onDuration. According to certain implementations of the first embodiment, X may be equal to 4 ms minus a configured WUS-Offset if the WUS-Offset (e.g., WUS occasion for monitoring PDCCH-WUS is configured WUS-Offset before the start of the onDuration) is smaller than 4 ms. If WUS-Offset is larger or equal to 4 ms, X is equal to zero.

In a second embodiment, a UE considers "Wake-Up" signals (e.g., PDCCH-WUS) for determining whether to report CSI and/or SRS. In such an embodiment, the UE considers WUS-related signaling to determine whether a symbol n would be in DRX active time and/or not be in active time and whether to transmit periodic SRS, transmit semi-persistent SRS, report CSI on PUCCH, and/or report semi-persistent CSI on PUSCH. In such an embodiment, the UE may not transmit periodic SRS, not transmit semi-persistent SRS, not report CSI on PUCCH, and/or not report semi-persistent CSI on PUSCH during (e.g., the beginning of) onDuration even if drx-onDurationTimer is running and UE is in active time (e.g., WUS signal has indicated the UE to start drx-onDurationTimer) if the WUS-Offset is smaller than 4 ms. This may be because if the WUS occasion is configured to be less than 4 ms before the start of a next DRX cycle, the UE cannot consider the PDCCH-WUS signaling for determining whether to send CSI and/or SRS for the first (e.g., 4−WUS-Offset) ms of the OnDuration period (e.g., the UE would act as not having received a PDCCH-WUS indicating for the UE to start the drx-onDurationTimer.

A second example of the second embodiment is shown herein. In the example of the second embodiment, WUS-PDCCH denotes a WUS signal (e.g., PDCCH-based power saving signal and/or channel) indicating whether the UE should start a drx-onDurationTimer at the beginning of a next DRX cycle (e.g., next onDuration). The second example of the second embodiment is as follows: 1) in current symbol n, if a MAC entity would not be in an active time considering grants, assignments, a DRX command MAC CE, a long DRX command MAC CE, a PDCCH-WUS received, and/or a scheduling request sent until 4 ms prior to symbol n if evaluating all DRX active time conditions as specified in this clause: a) not transmit periodic SRS and semi-persistent SRS; and b) not report CSI on PUCCH and semi-persistent CSI on PUSCH; and 2) if CSI masking (e.g., csi-Mask) is setup by upper layers: in current symbol n, if drx-onDurationTimer would not be running considering grants, assignments, a DRX command MAC CE, a long DRX Command MAC CE, and/or a PDCCH-WUS received until 4 ms prior to symbol n if evaluating all DRX active time conditions as specified in this clause: not report CSI on PUCCH.

In a third embodiment, a UE may report CSI and/or SRS during an "onDuration period" at a beginning of a DRX cycle even though the drx-onDurationTimer is not running (e.g., the UE is not in active time) if a WUS occasion is configured with an offset before a start of the onDuration which is less than X ms. If the WUS occasion is configured with an offset before the start of the onDuration which is equal to or larger than X ms, the UE considers the WUS related signaling (e.g., WUS-PDCCH) for determining whether the UE reports CSI and/or SRS. In one specific implementation of the third embodiment, X is equal to 4 ms. According to another implementation of the third embodiment, if the offset (e.g., offset between a WUS occasion and an OnDuration) is equal to or larger than 4 ms in a current symbol n, and if the MAC entity would not be in an active time considering WUS-signaling, grants, assignments, a DRX command MAC CE, a long DRX command MAC CE received, and/or a scheduling request sent until 4 ms prior to symbol n if evaluating all DRX active time conditions, the UE doesn't transmit periodic SRS, does not transmit semi-persistent SRS, does not report CSI on PUCCH, and/or does not report semi-persistent CSI on PUSCH. If the offset is smaller than 4 ms, in current symbol n, and if the MAC entity would not be in active time considering grants, assignments, a DRX command MAC CE, a long DRX command MAC CE (e.g., excluding WUS-signaling) received, and/or scheduling request sent until 4 ms prior to symbol n if evaluating all DRX active time conditions, the UE doesn't transmit periodic SRS, does not transmit semi-persistent SRS, doesn't report CSI on PUCCH, and/or does not report semi-persistent CSI on PUSCH. By not considering WUS-signaling for determining whether the UE is in an active time in symbol n, the UE may report CSI and/or SRS if drx-onDurationTimer is not running (e.g., WUS signaling indicates to not start the drx-onDurationTimer at the beginning of the next DRX cycle).

A third example of the third embodiment is shown herein. In the example of the third embodiment, WUS-PDCCH denotes a WUS signal (e.g., PDCCH-based power saving signal and/or channel) indicating whether the UE should start a drx-onDurationTimer at the beginning of a next DRX cycle. The third example of the third embodiment is as follows: 1) if WUS-offset is smaller than 4 ms, in current symbol n, if the MAC entity would not be in active time considering grants, assignments, a DRX command MAC CE, a long DRX command MAC CE (e.g., excluding PDCCH-WUS) received, and/or a scheduling request sent until 4 ms prior to symbol n if evaluating all DRX active time conditions as specified in this clause: a) not transmit periodic SRS and semi-persistent SRS defined; and b) not report CSI on PUCCH and semi-persistent CSI on PUSCH; 2) else, in current symbol n, if the MAC entity would not be in active time considering PDCCH-WUS, grants, assignments, a DRX command MAC CE, a long DRX command MAC CE received, and/or scheduling request sent until 4 ms prior to symbol n if evaluating all DRX active time conditions as specified in this clause: a) not transmit periodic SRS and semi-persistent SRS; and b) not report CSI on PUCCH and semi-persistent CSI on PUSCH; 3) if CSI masking (e.g., csi-Mask) is setup by upper layers and if WUS-offset is smaller than 4 ms in current symbol n, if drx-onDurationTimer would not be running considering grants, assignments, a DRX command MAC CE, and/or a long DRX command MAC CE (e.g., excluding PDCCH-WUS) received until 4 ms prior to symbol n if evaluating all DRX active time conditions as specified in this clause: a) not report CSI on PUCCH; 4) else in current symbol n, if drx-onDurationTimer would not be running considering PDCCH-WUS, grants, assignments, a DRX command MAC CE, and/or a long DRX command MAC CE received until 4 ms prior to symbol n if evaluating all DRX active time conditions as specified in this clause: not report CSI on PUCCH.

In a fourth embodiment, a UE is configured with a configuration indicating whether to report CSI and/or SRS (e.g., periodic SRS, semi-persistent SRS and/or report CSI on PUCCH and semi-persistent CSI on PUSCH) for the first x ms of OnDuration regardless of a DRX status of the UE (e.g., regardless of whether drx-onDurationTimer is actually running or not—PDCCH-WUS has indicated that the UE is to start and/or not start the drx-onDurationTimer) if WUS-Offset is smaller than x ms, e.g. 4 ms, or indicating not to report CSI and/or SRS for the first X ms of onDuration if WUS-Offset is smaller than x ms. The fourth embodiment may be combined with other WUS related configurations (e.g., WUS-Offset). According to one implementation of the fourth embodiment, the UE may receive a configuration via RRC signaling.

According to one implementation of the fourth embodiment, the PDCCH-WUS (e.g., wake-up PDCCH) may indicate to the UE whether to transmit periodic SRS, transmit semi-persistent SRS, report CSI on PUCCH, and/or report semi-persistent CSI on PUSCH for the first x ms of OnDuration if WUS-Offset is smaller than 4 ms. In such an embodiment, X may be equal to a 4 ms WUS-Offset.

In a fifth embodiment, a UE may start or restart a timer (e.g., bwp-InactivityTimer) upon reception of a PDCCH-WUS (e.g., wake-up PDCCH) indicating for the UE to switch a current active BWP. The PDCCH-WUS may contain a BWP-ID field indicating to the UE which BWP to monitor PDCCH for the next onDuration so that the UE will have already switched to a BWP appropriate for expected traffic by the time the onDuration starts. According to one implementation of the fifth embodiment, the UE may start and/or restart the timer upon having received a PDCCH-WUS indicating for the UE to switch to a different DL BWP (e.g., compared to a current active (DL) BWP associated with a serving cell) for a next onDuration. According to another implementation of the fifth embodiment, the UE starts and/or restarts a timer (e.g., a bwp-InactivityTimer) associated with an active DL BWP upon having received a PDCCH-WUS indicating to the UE to switch to a different DL BWP (e.g., compared to a current active (DL) BWP associated with a serving cell) for a next onDuration if the timer is started.

In a sixth embodiment, a UE stops a timer (e.g., a bwp-InactivityTimer) associated with an active DL BWP of a serving cell if the UE monitors a PDCCH-WUS at a WUS-occasions. In such an embodiment, the UE may implicitly activate a "wake-up" specific BWP for monitoring a wake-up PDCCH at WUS occasions. The UE may switch autonomously from a current active DL BWP to a wake-up BWP for PDCCH-WUS monitoring. In certain embodiments, a situation in which the timer expires and the UE has to switch to a DefaultDownlinkBWP or initialDownlinkBWP may be avoided.

Figure 5:
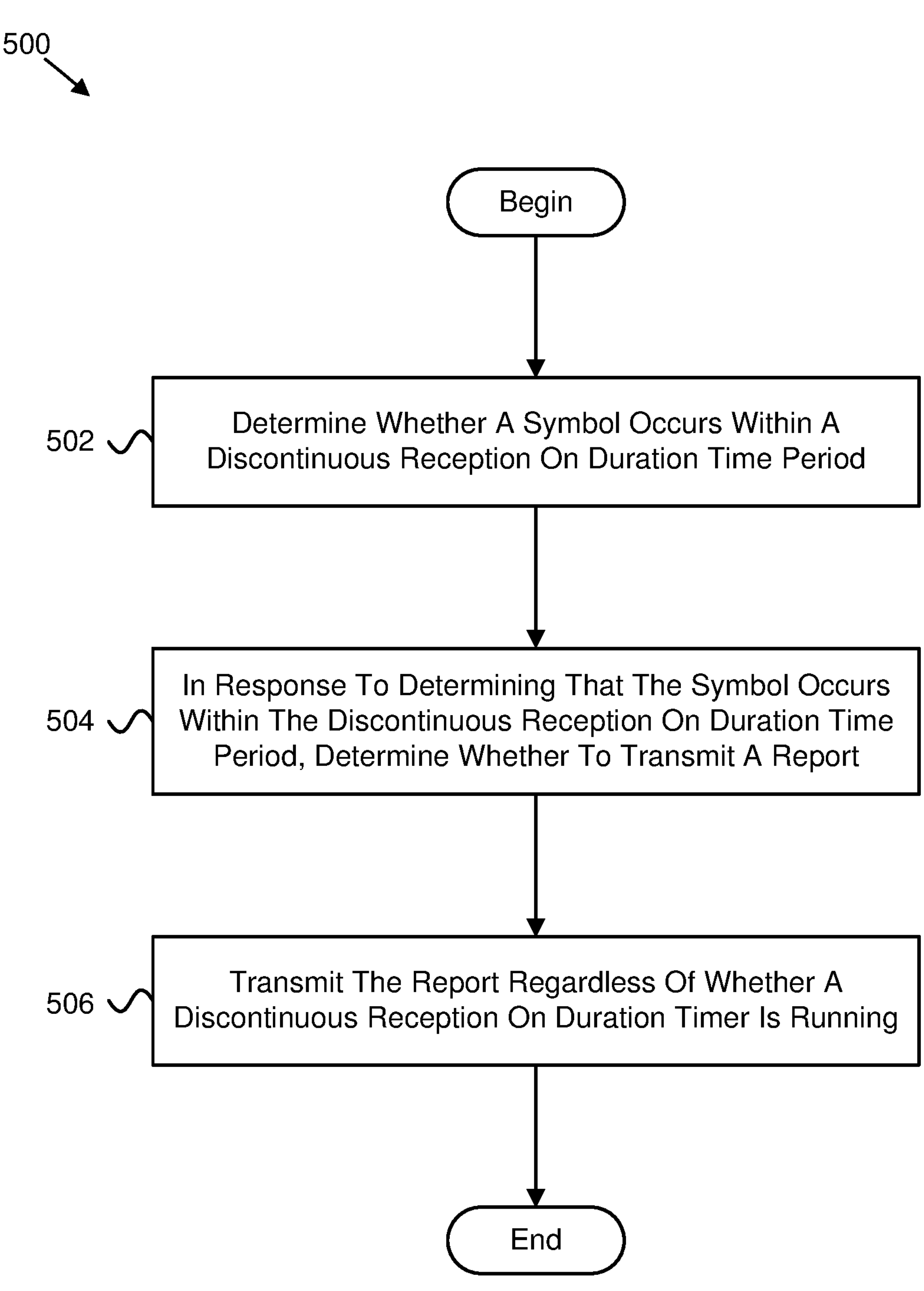
FIG. 5 is a flow chart diagram illustrating one embodiment of a method for reporting transmission for discontinuous reception.

FIG. 5 is a flow chart diagram illustrating one embodiment of a method 500 for reporting transmission for discontinuous reception. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes determining 502 whether a symbol occurs within a discontinuous reception on duration time period. In some embodiments, the method 500 includes, in response to determining that the symbol occurs within the discontinuous reception on duration time period, determining 504 whether to transmit a report. In certain embodiments, the method 500 includes transmitting 506 the report regardless of whether a discontinuous reception on duration timer is running.

In certain embodiments, the method 500 further comprises not considering wake up signaling to determine whether the discontinuous reception on duration timer is started. In some embodiments, the discontinuous reception on duration time period comprises a duration of the discontinuous reception on duration timer. In various embodiments, the report is a channel state information report.

In one embodiment, the report is a periodic channel state information report. In certain embodiments, the report is a semi-persistent channel state information report. In some embodiments, the report is a sounding reference signal report.

In various embodiments, the report is a periodic sounding reference signal report. In one embodiment, the report is a semi-persistent sounding reference signal report. In certain embodiments, the report is transmitted on a physical uplink control channel.

In some embodiments, the report is transmitted on a physical uplink shared channel. In various embodiments, the report is transmitted during a predetermined time period of the discontinuous reception on duration time period. In one embodiment, the predetermined time period comprises a beginning number of milliseconds of the discontinuous reception on duration time period.

In one embodiment, a method comprises: determining whether a symbol occurs within a discontinuous reception on duration time period; in response to determining that the symbol occurs within the discontinuous reception on duration time period, determining whether to transmit a report; and transmitting the report regardless of whether a discontinuous reception on duration timer is running.

In certain embodiments, the method further comprises not considering wake up signaling to determine whether the discontinuous reception on duration timer is started.

In some embodiments, the discontinuous reception on duration time period comprises a duration of the discontinuous reception on duration timer.

In various embodiments, the report is a channel state information report.

In one embodiment, the report is a periodic channel state information report.

In certain embodiments, the report is a semi-persistent channel state information report.

In some embodiments, the report is a sounding reference signal report.

In various embodiments, the report is a periodic sounding reference signal report.

In one embodiment, the report is a semi-persistent sounding reference signal report.

In certain embodiments, the report is transmitted on a physical uplink control channel.

In some embodiments, the report is transmitted on a physical uplink shared channel.

In various embodiments, the report is transmitted during a predetermined time period of the discontinuous reception on duration time period.

In one embodiment, the predetermined time period comprises a beginning number of milliseconds of the discontinuous reception on duration time period.

In one embodiment, an apparatus comprises: a processor that: determines whether a symbol occurs within a discontinuous reception on duration time period; and, in response to determining that the symbol occurs within the discontinuous reception on duration time period, determines whether to transmit a report; and a transmitter that transmits the report regardless of whether a discontinuous reception on duration timer is running.

In certain embodiments, the processor does not consider wake up signaling to determine whether the discontinuous reception on duration timer is started.

In some embodiments, the discontinuous reception on duration time period comprises a duration of the discontinuous reception on duration timer.

In various embodiments, the report is a channel state information report.

In one embodiment, the report is a periodic channel state information report.

In certain embodiments, the report is a semi-persistent channel state information report.

In some embodiments, the report is a sounding reference signal report.

In various embodiments, the report is a periodic sounding reference signal report.

In one embodiment, the report is a semi-persistent sounding reference signal report.

In certain embodiments, the report is transmitted on a physical uplink control channel.

In some embodiments, the report is transmitted on a physical uplink shared channel.

In various embodiments, the report is transmitted during a predetermined time period of the discontinuous reception on duration time period.

In one embodiment, the predetermined time period comprises a beginning number of milliseconds of the discontinuous reception on duration time period.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
- at least one memory; and
- at least one processor coupled with the at least one memory and configured to cause the UE to:
  - receive configuration information for periodic channel state information (CSI) reporting or periodic sounding reference signal (SRS) reporting;
  - receive a wake-up signal (WUS) indication within an offset duration of a discontinuous reception (DRX) cycle, wherein the offset duration occurs prior to an ON duration of the DRX cycle, and wherein the WUS indication indicates whether to start a DRX ON duration timer; and
  - perform the periodic CSI reporting or the periodic SRS reporting based on the configuration information and during the ON duration even when the DRX ON duration timer is not started due to the WUS indication.

2. The UE of claim 1, wherein the at least one processor is configured to cause the UE to:
- not start the DRX ON duration timer based on the received WUS indication.

3. The UE of claim 1, wherein, to perform the periodic reporting, the at least one processor is configured to cause the UE to:
- transmit periodic SRS.

4. The UE of claim 1, wherein, to perform the periodic reporting, the at least one processor is configured to cause the UE to:
- transmit semi-persistent SRS.

5. The UE of claim 1, wherein, to perform the periodic reporting, the at least one processor is configured to cause the UE to:
- transmit periodic CSI.

6. The UE of claim 1, wherein, to perform the periodic reporting, the at least one processor is configured to cause the UE to:
- transmit semi-persistent CSI.

7. A processor for wireless communication, comprising:
- at least one controller coupled with at least one memory and configured to cause the processor to:
  - receive configuration information for periodic channel state information (CSI) reporting or periodic sounding reference signal (SRS) reporting;
  - receive a wake-up signal (WUS) indication within an offset duration of a discontinuous reception (DRX) cycle, wherein the offset duration occurs prior to an ON duration of the DRX cycle, and wherein the WUS indication indicates whether to start a DRX ON duration timer; and
  - perform the periodic CSI reporting or the periodic SRS reporting based on the configuration information and during the ON duration even when the DRX ON duration timer is not started due to the WUS indication.

8. The processor of claim 7, wherein the at least one controller is configured to cause the processor to:
- not start the DRX ON duration timer based on the received WUS indication.

9. The processor of claim 7, wherein, to perform the periodic reporting, the at least one controller is configured to cause the processor to:
- transmit periodic SRS.

10. The processor of claim 7, wherein, to perform the periodic reporting, the at least one controller is configured to cause the processor to:
- transmit semi-persistent SRS.

11. The processor of claim 7, wherein, to perform the periodic reporting, the at least one controller is configured to cause the processor to:
- transmit periodic a CSI.

12. The processor of claim 7, wherein, to perform the periodic reporting, the at least one controller is configured to cause the processor to:
- transmit semi-persistent CSI.

13. A method performed by a user equipment (UE), the method comprising:
- receiving configuration information for periodic channel state information (CSI) reporting or periodic sounding reference signal (SRS) reporting;
- receiving a wake-up signal (WUS) indication within an offset duration of a discontinuous reception (DRX) cycle, wherein the offset duration occurs prior to an ON duration of the DRX cycle, and wherein the WUS indication indicates whether to start a DRX ON duration timer; and
- performing the periodic CSI reporting or the periodic SRS reporting based on the configuration information and during the ON duration even when the DRX ON duration timer is not started due to the WUS indication.

14. The method of claim 13, further comprising:
- not starting the DRX ON duration timer based on the received WUS indication.

15. The method of claim 13, wherein performing the periodic reporting comprises:
- transmitting periodic SRS.

16. The method of claim 13, wherein performing the periodic reporting comprises:
- transmitting semi-persistent SRS.

17. The method of claim 13, wherein performing the periodic reporting comprises:
- transmitting periodic a CSI.

18. A base station for wireless communication, comprising:
- at least one memory; and at least one processor coupled with the at least one memory and configured to cause the base station to:

transmit configuration information for periodic channel state information (CSI) reporting or periodic sounding reference signal (SRS) reporting;

transmit a wake-up signal (WUS) indication within an offset duration of a discontinuous reception (DRX) cycle, wherein the offset duration occurs prior to an ON duration of the DRX cycle, and wherein the WUS indication indicates whether to start a DRX ON duration timer; and receive the periodic CSI reporting or the periodic SRS reporting based on the configuration information and during the ON duration even when the DRX ON duration timer is not started due to the WUS indication.

19. A method for wireless communication performed by a base station, the method comprising:

transmitting configuration information for periodic channel state information (CSI) reporting or periodic sounding reference signal (SRS) reporting;

transmitting a wake-up signal (WUS) indication within an offset duration of a discontinuous reception (DRX) cycle, wherein the offset duration occurs prior to an ON duration of the DRX cycle, and wherein the WUS indication indicates whether to start a DRX ON duration timer; and receiving the periodic CSI reporting or the periodic SRS reporting based on the configuration information and during the ON duration even when the DRX ON duration timer is not started due to the WUS indication.

* * * * *